United States Patent Office 2,729,621
Patented Jan. 3, 1956

2,729,621

POLYMERIZATION OF DL-ALANINE CARBOANHYDRIDE AND ORIENTATION OF POLYMER

Ralph E. Miegel, Elsmere, Del., assignor to E. I. du Pont de Nemours and Company, Wilmington, Del., a corporation of Delaware No Drawing. Application November 24, 1950,
Serial No. 197,513

2 Claims. (Cl. 260—77.5)

This invention relates to new and useful alpha-amino acid polymers.

The N-carboanhydrides of alpha-amino acids have recently been demonstrated to offer a possible route to high molecular weight alpha-amino acid polymers, for instance, as reported by Woodward and Schramm, J. Am. Chem. Soc., 69, 1551 (1947) and in the copending application of MacDonald, Serial No. 766,457, filed August 5, 1947, now Patent Number 2,572,844. However, both of these reports deal solely with copolyamides. The teachings of this art, whether implicit or explicit, is to the effect that only copolyamides containing units from at least two different alpha-amino acids are capable of forming organic solvent soluble polymers of sufficiently high molecular weight to be capable of being formed into useful films and fibers.

In the copending application of Cleaver and Schreiber, Serial No. 71,756, filed January 19, 1949, now abandoned, it is pointed out that an organic solvent soluble film- and fiber-forming alpha-amino acid homopolymer can be prepared from synthetic optically inactive alpha-aminoisocaproic acid. Although this homopolyamide is capable of forming tough, strong, cold-drawable films and fibers, such products do not exhibit sufficient water sensitivity to make them as readily dyeable or as easily handleable by normally used aqueous processing treatments as is desired. These latter two properties are of the utmost importance in the preparation of fibers which are to have outstanding utility in the present wide field of synthetic fabrics.

This invention has as an object the preparation of a homopolyamide which is tough, strong, and cold-drawable to films and fibers and which is readily dyeable and processable by normally used aqueous textile processing treatments. Other objects will appear hereinafter.

These objects are accomplished by the present invention of oriented, high molecluar weight polyamides consisting solely of units from DL-alanine which afford strong, touch, organic solvent soluble films and fibers capable of being readily dyed and processed by normally used aqueous treatments. The invention also includes the preparation of the polymer by polymerizing DL-alanine N-carboanhydride [prepared by reacting DL-alanine or its salts with phosgene under anhydrous conditions as disclosed in the copending applications of MacDonald Serial No. 778,458, filed October 7, 1947, now abandoned, and Serial No. 83,299, filed March 24, 1949, now Patent Number 2,662,084, preferably in the presence of an ether type solvent as disclosed in the copending application of Prichard Serial No. 52,971, filed October 21, 1948, now abandoned] by heating the N-carboanhydride at temperatures in the range 55 to 115° C., preferably 60 to 85° C. for at least 20 hours in an inert liquid solvent for the monomer which is a non-solvent for the polymer, preferably in benzene solution, at a concentration not exceeding 14% and preferably in the range 0.5 to 10.0% and continuing the polymerization until the DL-alanine polyamide formed exhibits an inherent viscosity of at least 0.3, isolating the high molecular weight polyamide so formed and finally orienting it by drawing at least 100%. Since the films and fibers formed therefrom exhibit greater strength, it is preferred to continue the polymerization until such time as the DL-alanine polyamide exhibits an inherent viscosity of 0.6.

DL-alanine polyamide of relatively high molecular weight and of partially satisfactory properties in film- and fiber-form can be prepared by polymerizing DL-alanine N-carboanhydride in solution in an inert solvent for the monomer which is a non-solvent for the polymer and liquid at the polymerization temperature, e. g., a halogenated hydrocarbon or an aromatic hydrocarbon, under similar conditions. However, DL-alanine polyamide of the quality desired for outstanding films and fibers has thus far been most readily prepared by polymerization in benzene solution. Such a polymerization procedure is, therefore, accordingly preferred. Although polymeriztions may be carried out in halogenated or aromatic liquid hydrocarbon reaction media at higher concentrations, no successful polymerizations to the orientable high molecular weight poylmers of this invention have been obtained at solids concentrations higher than about 14%. A polymerization procedure using benzene as a polymerization medium at a solids concentration not exceeding about 14%, is, therefore, accordingly preferred.

Because of the greater ease of preparation of the DL-alanine polyamide in the requisite ranges of molecular weight as evidenced by the inherent viscosity, in the minimum amount of time, it is preferred to use highly purified DL-alanine N-carboanhydride as the starting material. Many methods for purifying the DL-alanine N-carboanhydride suggest themselves to those skilled in the art, such as recrystallization from limited quantities of a solvent, preferably taking advantage of the usual solubility/temperature relationship, sublimation, preferably under very high vacuum, and the like. A particularly convenient method of obtaining the DL-alanine N-carboanhydride in the ranges of purity necessary to enable the preparation of the preferred high molecular weight DL-alanine polyamide is to recrystallize the N-carboanhydride by a precipitation/crystallization technique from anhydrous diethyl ether/petroleum ether mixtures.

To carry out the last step, i. e., the orienting, described previously in the preparation of the oriented DL-alanine polyamides of this invention, it has been found necessary that the DL-alanine polyamide be first swollen by contact with a solvent or swelling agent for the polyamide. In the preparation of the oriented DL-alanine polyamide of this invention in film form, this normally means that the films once obtained (that is, after the casting solvent has been removed) must be contacted with a solvent or a swelling agent and then oriented. The lower alkanols (i. e., saturated, aliphatic monoalcohols of from one to four carbons which, other than the single hydroxyl group, are solely hydrocarbon in nature) have been found to be particularly convenient for use in this step and also capable of producing particularly outstanding, highly oriented and strong films.

For the preparation of the oriented DL-alanine polyamides of this invention in fiber form, no separate swelling step is usually necessary, particularly in the normally used wet-spinning procedures. In this process, the fibers are formed by pressure ejecting a solution of the polyamide through very small orifices into a coagulating bath. At this stage the fibers are partially solvated by residual traces of the original solvent, and also partially swollen by the coagulating bath, which in most instances will be a lower alkanol- or acetone-based bath. The fibers in this condition can be readily oriented by immediate air-drawing to relatively high levels, e. g., of the order of 200 to 400% of the undrawn length merely by drawing directly. If desired, they can be isolated from the spinning bath in this low order orientation stage and further oriented to the levels necessary for producing the oriented fibers of this invention, i. e., to at least 200% and preferably at least 300% of the undrawn length by drawing while hot, for example while immersed in a silicone bath at 225–275° C. For the normally obtained high molecular weight polyalanine, i. e., ranging in molecular weight from 15,000 to 45,000, it is preferred to carry out the drawing so that an overall draw of from 2X to 3X, i. e., to 200 to 300% of the undrawn length is obtained in both types of drawn fibers as well as the drawn films.

The following examples in which the parts given are by weight are presented to further illustrate this invention. As used therein, inherent viscosity ($\eta_{inh.}$) is defined by the following equation:

$$\eta_{inh.} = \frac{\ln \eta_{rel.}}{C}$$

wherein *ln* is the natural logarithm, $$\eta_{rel.} = \frac{\eta \text{ solution}}{\eta \text{ solvent}}$$

$\eta$ being viscosity, C is the concentration of the solute in grams per 100 cc. of solution. Unless otherwise noted all inherent viscosity results are obtained with the polyamide involved dissolved in m-cresol at a concentration of 0.5 gram of polymer per 100 cc. of solution at 25° C. Intrinsic viscosity, $[\eta]$, as used in these examples is defined by the following equation:

$$[\eta] = C \xrightarrow{\lim} 0 \frac{\ln \eta_{rel.}}{C}$$

wherein *ln*, C, and $\eta_{rel.}$ are as defined above. In all instances the intrinsic viscosity figures are determined from a series of results obtained with the polyamide involved dissolved in m-cresol at various decreasing concentrations from 0.5 gram per 100 cc. of solution and below at 25° C.

EXAMPLE I

A suspension of 35 parts of DL-alanine in 517 parts of purified anhydrous dioxane is prepared in a reactor opened to the atmosphere through drying tubes and equipped with a reflux water condenser, a stirrer and an inlet tube connected with a source of gaseous phosgene. The suspension is heated to 40° C. and gaseous phosgene is passed into the vigorously stirred suspension over a period of 1.5 hours while maintaining the temperature at 40–42° C. at such a rate that an excess of phosgene is used. The reaction mixture is then allowed to cool to room temperature and filtered under anhydrous conditions to remove the insoluble material (5 parts of DL-alanine hydrochloride representing about 10% of the starting material). The filtrate is then concentrated by distillation under reduced pressure at 30 to 40° C. to about 10% of its original volume. The oily concentrate thus obtained is washed with about 65 parts of petroleum ether which is then decanted and the residue taken up in about 280 parts of anhydrous diethyl ether. Approximately 5 parts of decolorizing charcoal are added to the resulting solution and the mixture allowed to stand at room temperature for about 20 minutes with occasional shaking. The decolorizing charcoal is removed from the mixture by filtration and the filtrate diluted with about 80 parts of petroleum ether and the mixture then cooled in an ice-water bath. DL-alanine N-carboanhydride begins to precipitate out in a relatively short time. When it appears that no further precipitation is occurring, approximately 250 parts of petroleum ether are then added and the resulting mixture cooled for about an additional hour in the ice-water bath and the crystalline product then removed by filtration. There is thus obtained 37 parts of DL-alanine N-carboanhydride corresponding to a conversion of 90% and a yield of 91%, taking into account the 5 parts of DL-alanine hydrochloride removed from the reaction zone as described above.

EXAMPLE II

A 27.7 part sample of DL-alanine N-carbonhydride prepared in essentially the same fashion described previously in Example I is dissolved in 175 parts of anhydrous diethyl ether at 30–35° C. No visible solid is noticed in the resulting solution although the solution is filtered as a precautionary measure. To the filtrate is added approximately 30 parts of petroleum ether and the cloudy solution thus obtained is cooled for about 20 to 30 minutes in an ice-water bath. At the end of this time there is no further indication of the formation of the solid which had begun to precipitate out when the solution was first cooled to 0° C. An additional 330 parts of petroleum ether is added and the mixture again cooled in an ice-water bath for about 20 to 30 minutes at the end of which time no further separation of product is noticed. The white solid crystalline material is removed by suction filtration and dried on the filter under anhydrous conditions. There is thus obtained 17.85 parts of purified DL-alanine N-carboanhydride. A sample of this material in a thin-walled glass capillary, when immersed in a melting point bath at 42° C., melts sharply at 44.5–45.5° C. as the temperature of the bath is slowly increased. Another sample of this DL-alanine N-carboanhydride, when immersed as described above in a melting point bath at 45° C., melts almost immediately at 45.0–45.5° C. as the temperature of the bath is slowly increased.

A portion of the above, once-recrystallized DL-alanine N-carboanhydride, is recrystallized again under the same general conditions except that relatively more anhydrous diethyl ether and appreciably less petroleum ether are used. Both these concentration changes, of course, tend to make the recovery of the DL-alanine N-carboanhydride less efficient and the quality of the product ultimately obtained thereby higher. The ultraviolet absorption spectrum is measured for a 1% solution of this twice-recrystallized DL-alanine N-carboanhydride in purified anhydrous dioxane. This spectrum indicates that purified DL-alanine N-carboanhydried exhibits a specific absorption coefficient of maximum value in the neighborhood of 2550 A. falling off rapidly until a value of less than 0.0015 is reached in the neighborhood of 2700 A. remaining less than 0.0015 throughout the range from 2700 A. up to and including 3200 A. with the general trend being that of a further slow decrease.

As used here and elsewhere in this specification, the specific extinction, $k$, is defined by Brode "Chemical Spectroscopy," second edition, Wiley (1943), page 190. The specific values of $k$ given herein were obtained using a Beckman spectrophotometer (page 174, ibid.) and calculated in concentration units of grams per liter and distance units of centimeters.

EXAMPLE III

*Preparation of high molecular weight DL-alanine homopolyamide*

A solution of 4.7 parts of DL-alanine N-carboanhydride [prepared as described previously in Example I and purified by one recrystallization as described previously in Example II] in 50 parts of anhydrous diethyl ether is filtered and diluted with 88 parts of reagent grade benzene. The resulting solution is heated at the reflux for one hour. At the end of this time, the diethyl ether is allowed to distill from the reaction flask. After all the ether is removed by distillation, the solution is maintained at the reflux (the boiling point of benzene) for a period of six days. The product which separates out during this time is removed from the polymerization mixture by filtration, vacuum dried, and taken up in formic acid. The resultant viscous solution is flowed in a thin film onto a glass plate and allowed to dry at room temperature. After removal from the casting surface, there is obtained a clear, strong, tough film of a high molecular weight DL-alanine polyamide. Samples of this film exhibit inherent viscosities of 0.43 and 0.40 at 0.1 and 0.3% concentrations, respectively. The DL-alanine polyamide films so prepared exhibit no orientation when examined by standard X-ray procedures. This is particularly surprising since the alpha-amino acid polyamides thus far known to us when cast into films by this same procedure exhibit relatively high degrees of orientation.

Samples of a DL-alanine polyamide of inherent viscosity of 0.73 in formic acid (prepared in essentially the same manner) are found to be insoluble in saturated lithium bromide, saturated urea, and ammoniacal copper oxide (169 parts ammonia per liter and 30–35 parts $Cu^{++}$ per liter (aqueous solutions even after standing for 21 hours at room temperature and for two and one-half hours on a steam bath. Similarly samples of the polyamide failed to dissolve in solutions prepared from equal volumes of water and, respectively, saturated aqueous lithium bromide and saturated aqueous urea solutions under the same conditions of time and temperature. This polyamide is soluble in formic acid, m-cresol, and 88% aqueous phenol whereas, optically active alanine homopolyamides, i. e., homopolyamides from D- or L-alanine are insoluble in these solvents (see the copending application of MacDonald Serial No. 108,327, filed August 2, 1949). Go and Tani, Bull. Chem. Soc. Japan, 14, 510 (1939) disclose the insolubility of low molecular weight powdery L-alanine homopolyamide in all common protein solvents and German patent application 70,168 IVc/39c (PB34,279) discloses that DL-alanine homopolyamide of medium molecular weight (of the order of 5,000) is soluble in such solvents as aqueous lithium bromide, ammoniacal copper oxide, aqueous urea, etc.

A 0.88 part sample of a DL-alanine homopolyamide in film form [$\eta_{inh.}$=0.53 and 0.46 at 0.1 and 0.3% concentrations, respectively] prepared in essentially the same manner is suspended in 100 parts of water and heated at 90° C. for 1.5 hours and then dried at 65° C. The film initially measures 44 mm. wide, 171 mm. long, and 6.7 mils thick. The water-extracted film, after drying, weighs 0.63 part, thus indicating a weight loss of approximately 29%. The film, while swollen, i. e., after the water treatment but before drying, measures approximately 52.4 mm. wide, 203.5 mm. long, and 7.6 mils thick. These swollen dimensions indicate, therefore, approximate 19, 19, and 14% increases in the length, width, and thickness of the film. On a volume basis, this means that the film on treatment with the 90° C. water swells to approximately 1.7 times its original dry volume. Samples of the water-treated and dried film exhibit inherent viscosities of 0.54 and 0.51 at 0.1 and 0.3% concentrations, respectively.

Conversely, a 0.132 part sample of an L-alanine homopolyamide in film form ([$\eta$]=3.20 in dichloroacetic acid) is suspended in 200 parts of water and heated at 82° C. for one hour and then dried at 65° C. The film initially measures 81 mm. long, 19 mm. wide, and 2.8 mils thick. The water-extracted film after drying weighs 0.132 part, thus indicating a weight loss of less than 1%. The film while swollen, i. e., after water treatment but before drying, measures approximately 82 mm. long, 19.5 mm. wide, and 3.2 mils thick. These swollen dimensions indicate, therefore, approximate 1.25%, 2.60%, and 14.30% increases in the length, width, and thickness of the film. On a volume basis this means the film on treatment with hot water swells to only about 1.18 times its original dry volume. On the other hand, similarly, the medium molecular weight DL-alanine homopolyamide described in the previously identified German patent application is characterized by swelling ten times its dry volume in water. These water swelling data serve to illustrate further the surprising differences in kind existing between the various alanine polyamides of the art and the oriented high molecular weight DL-alanine homopolyamides of this invention.

Molecular weight determinations carried out on samples of the high molecular weight DL-alanine homopolyamides of this invention prepared essentially in the same manner as discussed immediately above indicate such polyamides to be high molecular weight. For instance, samples of a DL-alanine homopolyamide ([$\eta$]=0.41 in formic acid) exhibit an apparent weight average molecular weight of 30,000 to 40,000 as determined by light scattering measurements. Similar determinations carried out on a DL-alanine homopolyamide of [$\eta$]=0.75 indicate an apparent weight average molecular weight of 55,000 to 75,000. In both these instances the light scattering observations were obtained on solutions of the homopolyamides involved dissolved in 98–100% formic acid.

Another similar polymerization carried out in reagent benzene at the reflux for five days with DL-alanine N-carboanhydride thrice recrystallized from ether-petroleum ether—further varying only in that the concentration of the polymerization solution was appreciably lower (about 0.9% DL-alanine N-carboanhydride)—yielded appreciably higher molecular weight DL-alanine homopolyamide. This homopolyamide exhibited an [$\eta$] in formic acid of 0.90.

EXAMPLE IV

A formic acid solution of a high molecular weight DL-alanine homopolyamide ($\eta_{inh.}$=0.34 at 0.1 and 0.3% concentrations), prepared in general as described in Example III, is flowed in a thin film onto a glass plate, and the formic acid allowed to evaporate at room temperature. The film is removed from the casting surface and soaked for a short time in a 2B alcohol bath and then stretched to three times its original length, i. e., drawn 3:1. After being dried for two days at room temperature, a sample of the drawn film exhibits a tenacity of 12,100 lbs./sq. in. and an elongation of 4%. Samples of similar films cast in a similar fashion exhibit appreciably lower tenacities prior to orientation.

Samples of the oriented DL-alanine homopolyamides of this invention in film or fiber form, prepared as described generally above, exhibit upon examination an X-ray chain identity period of 6.60 to 7.00±0.05 A. This chain identity period is characteristic of the natural "beta"-keratin type polymers and is in direct contrast to the characteristic 5.10 to 5.40±0.05 A. X-ray chain identity period of natural "alpha"-keratin type polymers, such as, for example, the high molecular weight, optically inactive, synthetic polyamide from DL-alpha-aminoisocaproic acid (discussed in greater detail in the copending application of Cleaver and Schreiber Serial No. 71,756, filed January 19, 1949). The X-ray chain identities and properties of these two characteristic groups of synthetic alpha-amino acid type polymers are discussed in greater detail in the copending application of Boynton Graham Serial No. 173,690, filed July 13, 1950, wherein the "alpha" and "beta" type polymers are for clarity of reference discussed as "type I" and "type II" polyamides. The phrase "chain identity period" is defined at page 188 of Bunn's Chemical Crystallography, Oxford, 1945.

EXAMPLE V

A film of a high molecular weight DL-alanine homopolyamide ($\eta_{inh.}$=0.40 at 0.1% concentration and 0.43 at 0.3% concentration) cast as described previously from formic acid solution is washed for approximately 30 minutes in water at about 65° C. and dried under vacuum at 50° C. The resultant film is then dissolved in formic acid solution and recast as before. Samples of this film exhibit an $\eta_{inh.}$=0.47 at both 0.1 and 0.3% concentrations. Strips of this recast film crack when bent through an angle of 180° when the resulting bend is creased.

X-ray diffraction patterns of this film exhibit no orientation.

Another portion of this same film, 29.3 mm. long, 2.2–2.5 mm. wide, and 5.5 mils thick, is soaked in 2B alcohol at room temperature for one hour. At the end of this time, the film, now 33 mm. long, is removed from the bath and drawn to a length of 77 mm., i. e., drawn 2.34:1. The drawn film is then dried for one hour at 65° C. and three hours at 100–105° C. under vacuum. After drying, the film measures 73±2 mm. in length. The film showed no evidence of cracking or breaking when subjected to the same bend and crease test through an angle of 180° previously described. X-ray diffraction patterns obtained on the drawn film clearly show that the film is highly oriented.

EXAMPLE VI

A 0.352 part portion of a formic acid cast film of a DL-alanine homopolyamide ($\eta_{inh.}$=0.57 at 0.1 and 0.3% concentrations), prepared in general as described previously in Example III, is suspended in 200 parts of water and the suspension heated on a steam bath for 50 minutes at 90° C. The film is removed from the water and dried at 65° C. There is thus obtained a 0.270 part film (77% recovery) which exhibits $\eta_{inh.}$ of 0.73 at 0.1% concentration and 0.69 at 0.3% concentration. A 0.226 part portion of this film is again water extracted as described previously. There is thus obtained a 0.220 part film, which upon a further water extraction in the manner previously described, remains constant in weight. This film is then dissolved in formic acid solution and recast. A 0.218 part portion of this film is then extracted in 200 parts of water for 1.5 hours on a steam bath at 90° C. After drying, there is thus obtained a 0.188 part (86.3% recovery) film which exhibit $\eta_{inh.}$=0.73 at 0.1 and 0.3% concentrations. Thus, water extraction improves the overall molecular weight of the DL-alanine homopolyamides, presumably through removal of lower molecular weight portions of the DL-alanine homopolyamides comprising the sample. Furthermore, the improvement in overall molecular weight through selective water extraction is made more efficient in repetitive stages if the homopolyamide sample involved is dissolved and recast between extractions.

EXAMPLE VII

Fifty-three (53) parts of a high molecular weight DL-alanine homopolyamide ($[\eta]$=0.5 in cresol), prepared in general as described previously in Example III, is dissolved in 212 parts of freshly distilled, water-white m-cresol by stirring under nitrogen for two and one-half hours at room temperature and for two and one-half hours at 70° C. The resulting solution is pressure filtered with nitrogen through felt and pressure spun at the rate of 2.4 ml. per minute through a 20-hole (0.025 inch hole diameter) platinum spinneret into an acetone coagulating bath at 25° C. The yarn travel in the coagulating bath is 36 inches and the windup of the coagulated yarn on the Godet wheel is at the rate of 27.9 feet per minute. The yarn is stretched 4.4 times in air at room temperature in being removed from the Godet wheel to a takeup bobbin at 123 feet per minute, washed in acetone at room temperature to remove residual m-cresol and then dried, sized and twisted 2.5 turns per inch. The following representative data are given for various samples of this yarn:

|  | I | II | III |
|---|---|---|---|
| Denier | 113 | 123 | 215 |
| Tenacity/Elongation (g. p. d./percent [1]) | 1.5/9 | 1.4/7 | 0.7/4 |
| Modulus (g. p. d./1 percent) |  |  | 53 | 14 |

[1] Incline plane, where g. p. d.=grams per denier.

The sticking point of the drawn yarn described above under entry III is 245° C.

Another sample of the same spinning solution is spun as described above except that the yarn is stretched only 1.8 times in air at room temperature in being taken off from the Godet wheel. It is further stretched 3.0 times in a liquid heat transfer bath at 260° C. through a 4 inch bath travel with the input rate of the yarn of 16 feet per minute and the yarn takeup out of the bath being at the rate of 48 feet per minute. This yarn exhibits a denier of 108 and a tenacity and elongation as measured on the incline plane of 1.0/3 g. p. d./1%. Another sample of yarn prepared from a further portion of the same spinning solution under similar conditions except that the yarn is stretched in air 3.5 times at room temperature in being taken off the Godet wheel. This yarn is then further stretched 1.5 times in a liquid heat transfer bath at 260° C. through a 4 inch bath travel with the input rate of the yarn being 32 feet per minute and the yarn takeup out of the bath being at the rate of 48 feet per minute. This yarn exhibits a denier of 104 and a tenacity/elongation of 1.2 g. p. d./2% as measured on the incline plane. X-ray examinations of various similar drawn yarn samples indicate the drawn yarn to be oriented in the directions parallel to the axis of the filaments. Various samples of such yarns are dyed by selected acid, acetate, direct and vat dyes.

EXAMPLE VIII

A solution of 2.0 parts of DL-alanine N-carboanhydride [prepared as described previously in Example I and purified by one recrystallization as described previously in Example II] in 74.5 parts of purified anhydrous chloroform (B. P. 61.3° C.) is prepared and filtered to remove the small traces of insoluble material. The resulting clear solution is heated at the reflux under anhydrous conditions for 71 hours. The polymer product which separates out during this time is removed from the polymerization mixture by filtration, vacuum dried and taken up in formic acid. The resultant viscous solution is flowed in a thin film onto a glass plate and the formic acid allowed to evaporate at room temperature. After removal from the casting surface, there is obtained a clear, self-supporting, tough film of DL-alanine homopolyamide. A portion of this film is washed continuously with hot tap water for 30 minutes and then dried at 65° C. During this water wash, the DL-alanine homopolyamide film decreases approximately 27% in weight and increases in length by approximately 35%. Upon examination, a sample of the water-washed film is found to exhibit $\eta_{inh.}$=0.52 and 0.49 at concentrations of 0.1 to 0.3%, respectively.

EXAMPLE IX

A solution of 54 parts of DL-alanine N-carboanhydride [prepared as described previously in Example I and purified by one recrystallization as described previously in Example II] in 250 parts of anhydrous diethyl ether is filtered and diluted with 300 parts of reagent grade toluene in a glass reactor fitted with a reflux condenser. [The water adsorbed on the inner surfaces of this polymerization reactor was previously removed by adding about 35 parts of anhydrous diethyl ether and distilling this to the atmosphere.] The ether/toluene solution of the N-carboanhydride is heated with stirring, protected from the atmosphere by a drying tube. The diethyl ether is removed by distillation and the resulting toluene solution of the N-carboanhydride heated at the reflux with stirring for 46 hours. The product, which separates out during this time, is removed from the polymerization mixture by filtration, vacuum dried and taken up in formic acid. The resultant viscous solution is flowed in a thin film onto a glass plate and the formic acid allowed to evaporate at room temperature. After removal from the casting surface, there is obtained a clear, strong, tough film of a high molecular weight DL-alanine homopolyamide. Samples of this film exhibit inherent viscosities of 0.36 and 0.31 at 0.1 and 0.3% concentrations, respectively.

Another sample of DL-alanine N-carboanhydride, similarly prepared and recrystallized, upon being polymerized under anhydrous conditions in reagent grade toluene at a solids concentration of approximately 3.8% at the reflux under anhydrous conditions for approximately 98 hours yields a DL-alanine homopolyamide exhibiting inherent viscosities of 0.46 and 0.40 at concentrations of 0.3 and 0.5%, respectively, in formic acid.

While other methods are well known in the art for the preparation of alpha-amino acid N-carboanhydrides, e. g., those of Leuchs, Ber. 39, 857 (1906), Leuchs and Geiger, Ber. 41, 1721 (1908) and Bergmann et al., Ber. 65, 1192 (1932) and J. Biol. Chem. 111, 245 (1933) wherein alpha-amino acid N-carboanhydrides are prepared by a series of reactions involving the conversion of the amino acid or its ester to the corresponding N-carbomethoxy, carboethoxy, or carbobenzyloxy derivatives and the treatment of this intermediate derivative with thionyl chloride or phosphorus pentachloride to form the corresponding N-carboalkoxy acid chloride and finally the formation of the desired N-carboanhydride from this intermediate through a ring closing reaction involving liberation of alkyl chloride and the much less convenient method of Curtius involving the heat induced rearrangement of malonic azide acids and esters (see for instance, Curtius, J. prakt. Chem., 125, 211 (1930), Curtius and Sieber, Ber. 55, 1543 (1922), and Wesseley, Z. physiol. Chem. 146, 72 (1925)), nevertheless the preparative methods of MacDonald and Prichard, which are discussed in detail in the previously identified copending applications of these inventors and which involve the direct reaction of phosgene with the necessary amino acid or salt thereof, are greatly superior to any of the above discussed literature methods not only in convenience, cost, and availability of reactants, but also to an outstanding degree in reaction efficiency as judged by yields and conversions. Furthermore, for reasons as yet unknown, it has thus far proven impossible to prepare the oriented, high molecular weight DL-alanine homopolyamides of this invention from DL-alanine N-carboanhydride prepared by any other method than those of MacDonald and Prichard, no matter under what conditions the polymerization is carried out nor how many times the N-carboanhydride is recrystallized. It thus appears at present that, particularly as to impurities and side products present and, therefore, as to proper methods of purification, that DL-alanine N-carboanhydride of the levels of purity necessary for the preparation of the oriented, high molecular weight DL-alanine homopolyamides of this invention can only be prepared by the direct reaction of phosgene on DL-alanine or its salts by the methods of MacDonald and Prichard.

For the preparation of the oriented high molecular weight DL-alanine homopolyamides of this invention, it is necessary that the DL-alanine N-carboanhydride however prepared be in a high state of purity. In those instances where purification proves necessary, a convenient and ready method for carrying out this purification to the necessary levels involves the recrystallization of the N-carboanhydride by a precipitation-crystallization technique from anhydrous diethyl ether and petroleum ether mixtures. Of course, other methods of purification known in the art may be used, e. g., chromatography, sublimation, and distillation (especially high vacuum, essentially molecular). However, the above-mentioned precipitation-crystallization technique is preferred because of its simplicity and efficiency.

For example, in recrystallizing 10 parts of DL-alanine N-carboanhydride, it is necessary merely to dissolve the N-carboanhydride in about 80 parts of warm anhydrous diethyl ether (i. e., at temperatures from 30 to 35° C., but below the boiling point) and to remove any undissolved material from the resulting solution by filtration under anhydrous conditions. Petroleum ether is then added slowly with stirring to the resulting clear solution until the point of first noticeable and persistent cloudiness is reached (usually this requires about 15 to 30 parts of petroleum ether). The resulting cloudy solution is then cooled to about 0° C. The DL-alanine N-carboanhydride begins to crystallize out in a relatively short time. When no apparent further crystallization occurs, additional petroleum ether is added until a total amount corresponding to approximately one to two or more times the volume of the diethyl ether used has been added. The resulting mixture is allowed to stand at about 0° C. for approximately an additional 20 to 30 minutes, and the purified crystalline DL-alanine N-carboanhydride removed by suction filtration and dried on the filter—all under anhydrous conditions.

The recrystallization may, of course, be carried out at temperatures both lower and higher than 0° C. However, if temperatures appreciably lower than 0° C. are used, the purification effected is nowhere near as complete. If temperatures appreciably higher than 0° C. are used, the purification effected gives no evidence of being noticeably better. The increased time necessary and the lowered efficiency of recovery both operate against such conditions being those of preference.

Adequate criteria of purity of the DL-alanine N-carboanhydride necessary to prepare the high molecular weight oriented DL-alanine homopolyamide of this invention are that the N-carboanhydride (a) contain no chlorine within the limit of error of the analytical method used (generally micro- or semimicrogravimetric procedures); (b) contain 12.2% ± 0.2% nitrogen (12.2% being the calculated nitrogen percentage) as determined by the Dumas procedure; and (c) exhibit a specific ultraviolet extinction of maximum value in the neighborhood of 2550 A., falling off rapidly until a value of less than 0.0015 is reached in the vicinity of 2700 A. with no increase above 0.0015 and a general gradual decrease of the specific extinction in the range up to and including 3200 A.

The melting point of DL-alanine N-carboanhydride is, in general, of no particular value in indicating the relative purity of the material because of the fact that, being a temperature of melting with decomposition, it varies over a wide range, depending on the rate of heating and the temperature at which the determination is started. These factors are, of course, relatively difficult to control for a compound melting in the relatively low temperature range that DL-alanine N-carboanhydride does (i. e., 45–55° C.).

The three criteria of purity mentioned above are sufficient in themselves for determining whether a given sample of DL-alanine N-carboanhydride is capable of polymerization under the previously discussed preferred conditions to a high molecular weight, orientable DL-analine homopolyamide of this invention. It has been found that DL-alanine N-carboanhydride which has been recrystallized two to three times by the above-previously-described recrystallization technique, is capable of forming the desired polyamide. Accordingly, rather than obtain the time consuming data discussed above for each sample of the N-carboanhydride, it has been found most expedient to recrystallize the DL-alanine N-carboanhydride at least two, and usually three, times prior to polymerization.

In the previously mentioned copending applications of MacDonald and Prichard, it has been pointed out that the alkali metal, alkaline earth metal, and hydrohalide salts of alpha-amino acids as well as the acids themselves can be used in the preparation of the corresponding N-carboanhydrides by reaction with phosgene. In preparing the starting DL-alanine N-carboanhydride necessary for obtaining the products of this invention, it is preferred to use the free acid itself, i. e., DL-alanine, since it is more readily available at relatively low costs. Adequate criteria of purity of the starting DL-alanine are that it exhibit upon analysis: a neutralization equivalent (N. E.) of 89.1 ± 0.45 (the calculated value being 89.1), only traces of inorganic contaminants after ashing, and no ultraviolet absorption above 2500 A. Although many of the commercially available grades of DL-alanine are sufficiently pure as received, some others have been found to be insufficiently pure. A ready method of purifying such materials to the desired level is to recrystallize the DL-alanine from approximately 3 parts of distilled water per part of amino acid by heating the sample up to just below the boiling point with the correct amount of water, filtering the hot solution, and allowing it to cool and finally to stand overnight at room temperature.

For the best yields of DL-alanine N-carboanhydride of the highest quality, thorough precautions should be taken to make sure that the starting DL-alanine is as free of adsorbed water vapor as possible. This, of course, becomes particularly pertinent during hot and humid weather conditions since it is normally impractical to store the starting DL-alanine in as carefully conditioned an atmosphere as would be desired. It has been found that baking the DL-alanine at 95 to 105° C. for a period of approximately 16 to 18 hours immediately before conversion to the N-carboanhydride appreciably increases the yield of good quality N-carboanhydride obtained. This baking has also been found to increase at least slightly the yield of N-carboanhydride even when the reaction is carried out under generally rather dry atmospheric conditions. This latter improvement is presumably due to the high and relatively long term water adsorptability of DL-alanine as normally obtained (a very fine powder with a relatively high surface to weight ratio).

Many methods of polymerization of N-carboanhydrides to high molecular weight polyamides are known in the art, e. g., bulk fusion, polymerization in suspension in unreactive liquid organic media, etc. However, as pointed out previously in the specification, for the preparation of DL-alanine homopolyamide of sufficiently high molecular weight (e. g., inherent viscosity of at least 0.3) to allow the preparation of the tough, strong, water sensitive, oriented films and fibers of this invention, it is necessary that the polymerization of the N-carboanhydride be carried out in an organic liquid nonreactive with the DL-alanine N-carboanhydride at a concentration no greater than about 14% and preferably in the range of 0.5 to 10.0%. Polymerizations carried out at solids concentrations in the lower portions of this range, usually from 0.5 to 3.0%, generally yield higher molecular weight polymer in less time. Furthermore, polymerizations carried out in these lower concentrations generally lead to the preparation of the highest molecular weight polymer. Examples of such organic liquids include halogenated hydrocarbon solvents such as chloroform, carbon tetrachloride, tetrachloroethane, dichloroethylene, chlorobenzene, and tetrachloroethylene; liquid aromatic hydrocarbons, such as the xylenes, toluene, etc. However, as mentioned previously in the specification, the best results, i. e., the most desirable DL-alanine homopolyamides, are obtained when the polymerization is carried out in benzene solution.

As has been previously mentioned in Example III, the molecular weight of the DL-alanine homopolyamides, as evidenced by viscosity measurements, markedly increases as the concentration of the DL-alanine N-carboanhydride decreases with respect to the organic, liquid polymerization medium being used. Thus, other conditions being the same, such as the degree of purity of the DL-alanine N-carboanhydride and the temperature and time of polymerization, higher molecular weight DL-alanine homopolyamide is obtained by polymerizing at lower concentrations. Such an increase becomes appreciably more noticeable as the concentration is decreased to the range of 1% or less, based on the organic, liquid, polymerization medium.

For the preparation of the highest quality polymer, as has already been pointed out, it is desirable to use reagent grade benzene as the polymerization medium. It is also beneficial to distill a small portion of the benzene medium from the polymerization reactor at the start of the polymerization. It has been found that such a procedure serves to remove the traces of water usually adsorbed on the inner surface of the glass equipment normally used. For convenience, it is normally preferred to prepare an anhydrous diethyl ether solution of the DL-alanine N-carboanhydride, mix this with enough reagent grade benzene to give the desired solids concentration in the polymerization reactor to be used, and then to heat the polymerization reactor to the desired temperature, removing the diethyl ether and a small portion of the benzene by distillation and finally maintaining the reaction mixture under reflux at the desired temperature for the desired time. The quantities of water removed as the well-known benzene/water binary by this method are in most instances relatively minor. However, even these minor quantities are of appreciable magnitude in comparison with the known concentration of water involved in the reagent benzene used as the polymerization medium (i. e., less than 0.02%).

Temperatures in the range of 40° C. or as high as 150–200° C. may be used in the polymerization cycle with superatmospheric pressure when necessary. However, to insure the preparation of the best quality DL-alanine homopolyamide in a reasonable amount of time, temperatures of at least 65° C. and preferably in the neighborhood of 80° C. have been found to be preferred. Although polymerization is much more rapid at higher temperatures, to insure the preparation of the highest quality DL-alanine homopolyamides, it is preferred to use temperatures no higher than 115° C. and preferably no higher than in the neighborhood of 80° C. Similarly, although superatmospheric pressures may be used, the best quality DL-alanine homopolyamide can most readily be prepared by polymerizing under the obviously more convenient atmospheric pressure.

Although polymerization times of as short as 20 hours may be used, it is preferred to carry out the polymerizations for from 36 to 72 hours at temperatures in the neighborhood of 80° C. Obviously, there is no effective upper limit to the times of polymerization since the polymerization can be carried out for as long as is desired. However, in the interests of practicability, it has been found that carrying out the polymerization for longer than 168 hours shows no improvement in the molecular weight of the DL-alanine homopolyamides produced.

No specific illustration is given in the foregoing examples of any added polymerization initiators other than the relatively minute quantities of water in the reagent grade benzene polymerization medium, i. e., less than 0.02%. However, it is to be understood that minute quantities of other initiators may be added to the polymerization system if desired. Suitable initiators are disclosed in the copending applications of MacDonald Serial No. 778,031 and Serial No. 778,032, filed October 4, 1947. Of these added initiators, it is preferred to use the amino-hydrogen-containing amines since they serve more effectively to both initiate and control the polymerization, and it is relatively more easy to obtain high molecular weight polyamides therewith.

The foregoing detailed description has been given for clearness of understanding only and no unnecessary limitations are to be understood therefrom. The invention is not limited to the exact details shown and described for obvious modifications will occur to those skilled in the art.

What is claimed is:

1. Process of preparing an oriented, high molecular weight, linear polyamide, the recurring units of which are DL-alanine units which comprises heating DL-alanine-N-carboanhydride, at 55–115° C. for at least 20 hours in solution in an inert solvent, liquid at the reaction temperature, for the said DL-alanine-N-carboanhydride but which is a non-solvent for poly-DL-alanine, said solution containing not more than fourteen per cent, by weight, of DL-alanine N-carboanhydride, said N-carboanhydride being analytically free from chlorine, containing 12.2%±0.2% nitrogen as determined by the Dumas method, and having a specific ultraviolet extinction of maximum value about 2550 A. falling off rapidly to a value below 0.0015 in the vicinity of 2700 A., with no increase above 0.0015 and a general gradual decrease in specific extinction in the range to and including 3200 A., continuing the polymerization until the resulting polyamide has an inherent viscosity of at least 0.3 and orienting the polyamide by stretching the polyamide, swollen with a swelling agent therefor, until the stretched length of the polyamide is at least 200% of its unstretched length.

2. Process of preparing an oriented, high molecular weight, linear polyamide, the recurring units of which are DL-alanine units which comprises heating DL-alanine-N-carboanhydride, at 55–115° C. for at least 20 hours in solution in an inert solvent, liquid at the reaction temperature, for the said DL-alanine-N-carboanhydride but which is a non-solvent for poly-DL-alanine, said solution containing not more than fourteen per cent, by weight, of DL-alanine N-carboanhydride, said N-carboanhydride being analytically free from chlorine, containing 12.2%±0.2% nitrogen as determined by the Dumas method, and having a specific ultraviolet extinction of maximum value about 2550 A. falling off rapidly to a value below 0.0015 in the vicinity of 2700 A., with no increase above 0.0015 and a general gradual decrease in specific extinction in the range to and including 3200 A., continuing the polymerization until the resulting polyamide has an inherent viscosity of at least 0.3 and orienting the polyamide by stretching the polyamide, swollen with a lower alkanol, until the stretched length of the polyamide is at least 200% of its unstretched length.

References Cited in the file of this patent

UNITED STATES PATENTS

| | | |
|---|---|---|
| 2,071,253 | Carothers | Feb. 16, 1937 |
| 2,516,145 | Prichard | July 25, 1950 |
| 2,534,283 | MacDonald | Dec. 19, 1950 |
| 2,540,855 | Tullock | Feb. 6, 1951 |

OTHER REFERENCES

Go et al.: Bull Chem. Soc. Japan, 1939, pages 510, 512, 514, 516.

Frankel et al.: Journ. Am. Chem. Soc., vol. 64, 1942, pp. 2264 to 2271.

Office of Technical Services, PB 34,279, Dec. 13, 1946, 3 pp.

Astbury et al.: Nature, vol. 162, Oct. 16, 1948, page 596.

Alfrey: Mechanical Behavior of High Polymers, Interscience, 1948, page 500.